(12) United States Patent
Prosi

(10) Patent No.: US 7,110,611 B2
(45) Date of Patent: Sep. 19, 2006

(54) METHOD FOR THE DATA COMPRESSION OF FRAMING MASK DATA

(75) Inventor: Rainer Prosi, Kiel (DE)

(73) Assignee: Eastman Kodak Company, Rochester, NY (US)

( * ) Notice: Subject to any disclaimer, the term of this patent is extended or adjusted under 35 U.S.C. 154(b) by 776 days.

(21) Appl. No.: 10/356,882

(22) Filed: Feb. 3, 2003

(65) Prior Publication Data

US 2004/0028283 A1 Feb. 12, 2004

(30) Foreign Application Priority Data

Feb. 11, 2002 (DE) ................................ 102 05 546

(51) Int. Cl.
*G06K 9/36* (2006.01)
*G06K 9/00* (2006.01)

(52) U.S. Cl. ..................................... 382/245

(58) Field of Classification Search ................ 382/164, 382/173, 176, 232, 233, 235, 239, 244, 245, 382/248, 250, 251; 341/59, 60, 73, 106; 358/426.13, 501, 515, 517, 530; 375/240.18, 375/240.2, 240.23

See application file for complete search history.

(56) References Cited

U.S. PATENT DOCUMENTS

| | | | |
|---|---|---|---|
| 3,748,379 A * | 7/1973 | Epstein et al. ............... | 382/245 |
| 4,435,072 A | 3/1984 | Adachi et al. | |
| 4,610,027 A * | 9/1986 | Anderson et al. ........... | 382/245 |
| 4,783,834 A * | 11/1988 | Anderson et al. ........... | 382/245 |
| 4,811,113 A * | 3/1989 | Ozeki et al. ................. | 382/245 |
| 4,888,645 A * | 12/1989 | Mitchell et al. ............ | 382/235 |
| 5,046,119 A | 9/1991 | Hoffert et al. | |
| 5,245,441 A * | 9/1993 | Ruben ......................... | 382/235 |
| 5,276,525 A * | 1/1994 | Gharavi ....................... | 382/245 |
| 5,319,469 A | 6/1994 | Moolenaar | |
| 5,536,921 A | 7/1996 | Hedrick et al. | |
| 6,876,774 B1 * | 4/2005 | Satoh et al. ................. | 382/245 |
| 6,961,475 B1 * | 11/2005 | Schwartz et al. ........... | 382/248 |
| 2004/0028283 A1 * | 2/2004 | Prosi .......................... | 382/245 |

FOREIGN PATENT DOCUMENTS

| | | |
|---|---|---|
| DE | 198 17 720 A1 | 4/1998 |
| DE | 100 12 521 A1 | 3/2000 |
| EP | 0 582 331 A1 | 2/1994 |

* cited by examiner

*Primary Examiner*—Amir Alavi
(74) *Attorney, Agent, or Firm*—Lawrence P. Kessler

(57) ABSTRACT

A method for the compression of two-value framing mask data (4) is described, with which the assembly of background image data (2) and variable image data (3) to a physical page (1) is controlled, whereby the framing mask data (4) are partitioned into blocks (7), horizontal sequences of blocks (7) with the same content are coded as run lengths, and in horizontal sequences of blocks (7) with dissimilar content, only the lines of a block (7) that differ from the preceding block (7) are coded. The partitioning of the framing mask data (4) into the blocks (7) coincides with the block structure in the compressed background image data (2) and/or in the compressed variable image data (3).

6 Claims, 6 Drawing Sheets

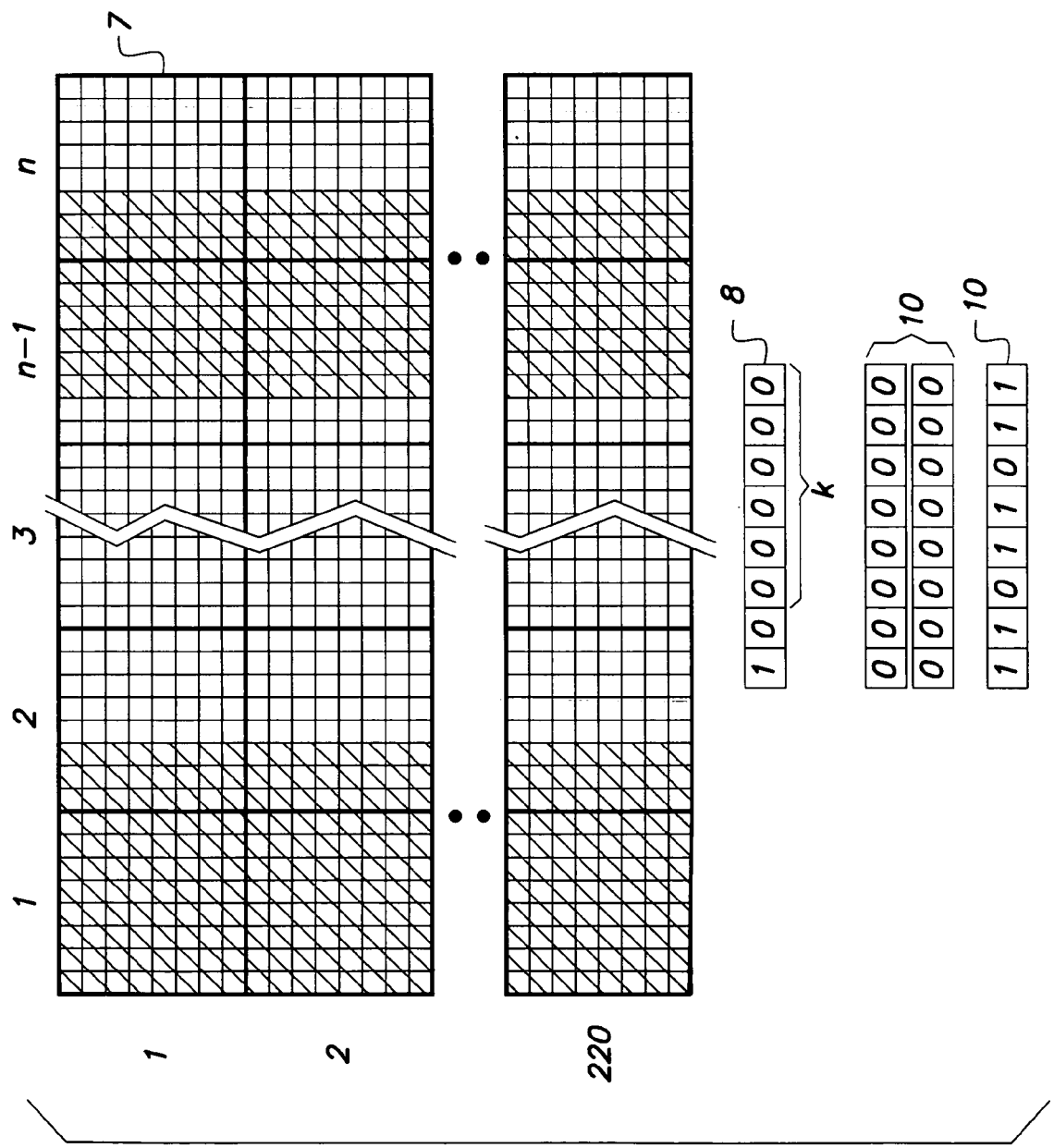

METHOD FOR THE DATA COMPRESSION OF FRAMING MASK DATA

Figure 1:
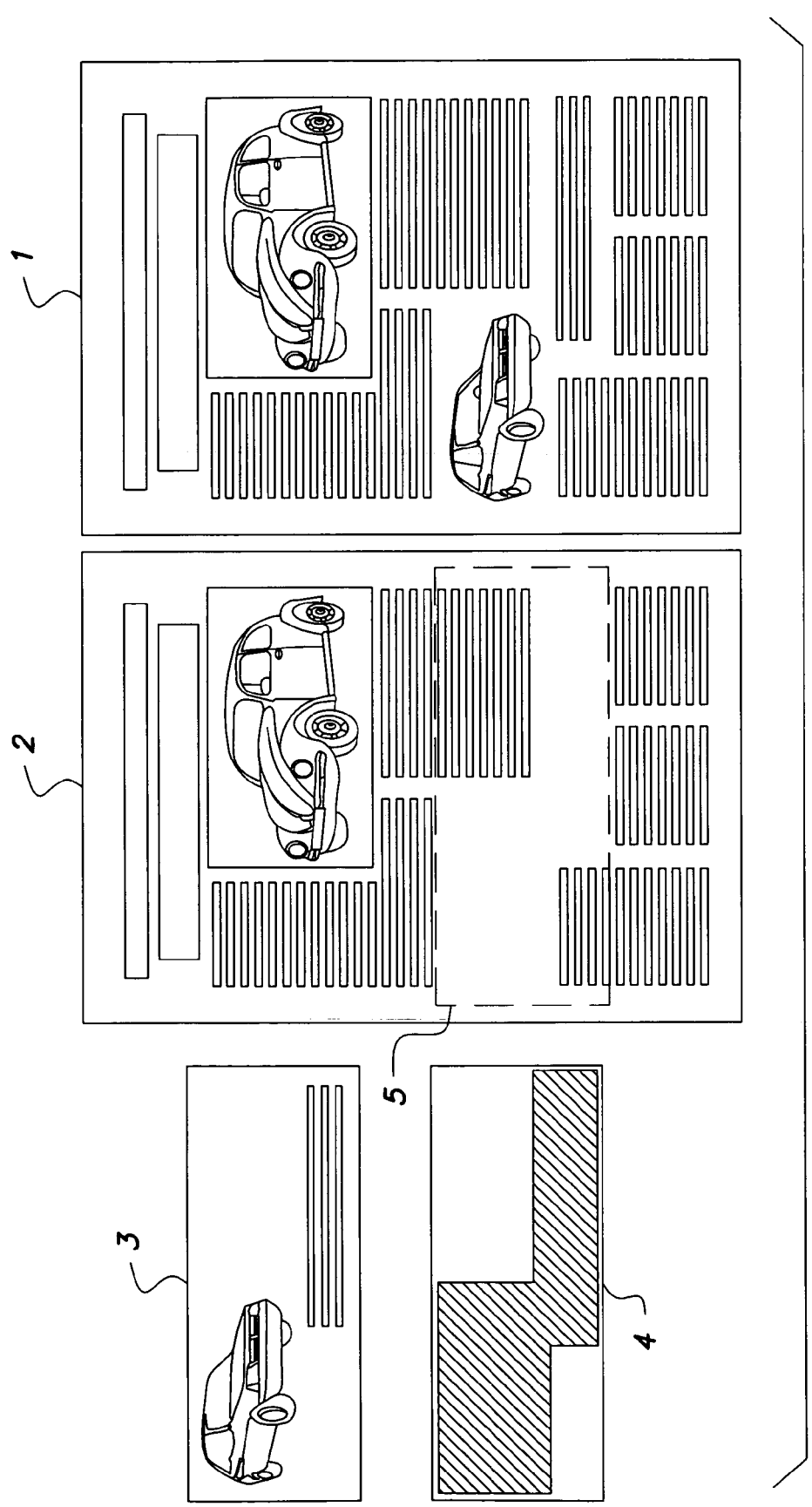

The invention relates to the area of the digital image processing and concerns a method for the compression of data of a digitally generated or stored framing mask to a reduced amount of data. Compression methods for image data are used in many application areas of digital image processing, in order to save money, memory, data transfer time, processing time and thus costs due to the reduced amount of data.

An important application area is the electronic reproduction technology, by means of which very large image data amounts are processed. In reproduction technology, layout sketches for physical pages are generated, which contain all the page elements such as texts, graphics and images. In the case of electronic manufacturing of page elements, these elements are in the form of digital data. For example, the data for an image are generated in which the image is scanned point-to-point and line-to-line in a scanner, every pixel is separated in colored elements and the color values of these elements are digitized. The data for texts and graphics are generally generated directly into the computer by word processing and graphic programs. Depending on the data output process used later, e.g. output for a colored printer or printing on a conventional or digital printer, the data for the page elements are generated in the printing colors of four-colored printing, cyan, magenta, yellow and black (CMYK) and stored.

In later operations, the digitized texts, graphics and images are electronically installed in a processing station with visual control on a color monitor or automatically according to stored layout requirements, i.e. the page elements are, for example, assembled in a storage area of the processing station according to the layout for a physical page. The completed physical page is converted therein into a data format suitable for output and stored. The physical page data for each of the printing colors (RGB and CMYK) are designated as color separation data. Printing plates for a conventional printer are manufactured with the color separation data, or the later are directly transferred to a fast color printer or to a digital printer that prints them out.

A sufficient resolution for the color separation data of physical pages is, for example, 24 pixels/mm (600 pixels/inch). If four color values are stored (CMYK) for each pixel and the densities of the color values are each digitized with 8 bits (=one byte), then the result for a physical page of the DIN A4 size is a data amount of $$210 \text{ mm} \times 297 \text{ mm} \times 24 \times 24 \times 4 = 143.700.480 \text{ Byte} \quad (1)$$

i.e., approximately 144 megabytes. This amount of data is still multiplied by the number of pages in a printing product. Very large amounts of data must therefore be processed in the electronic reproduction technology. As a result, methods for effective and rapid compression and decompression of this amount of data play a major role.

Areas with two types of image data can be distinguished on physical pages; on the one hand, areas that contain very many different colors that change from pixel to pixel, e.g., scanned images, and on the other hand, areas that contain only two colors, e.g., texts or graphics. In areas that contain more than two colors, i.e. color graphics, there are often also partitions with only two colors. For both types of image data, different compression procedures are known, which are optimized for the respective type, i.e., they target the largest compression factor possible and do not distort the image data or as little as possible.

For the compression of the image data in areas with many different colors, methods for transform coding are known. This method partitions the image data into blocks of, for example, 8×8 pixels; the blocks are transformed in a frequency representation (e.g., by means of the discrete cosine transformation) and only the relevant frequency components are stored in coded form. A widespread form of this type of method is known by the designation JPEG (Joint Photographic Experts Group) and has been internationally standardized.

Methods of block coding are also known for the compression of the image data in the areas with two colors. Such a method is described in the European EP-1074143-B1. The matrix of the pixels is partitioned into blocks; the blocks are classified into one-color blocks, two-color blocks and multicolor blocks and the different block types are compressed according to different methods. The color of the one-color blocks as well as the foreground and the background color in the two-color blocks can be different in different image areas. Runs of one-color blocks are compressed with run-length coding. Two-color blocks are compressed as bit patterns, whereby the bits indicate which pixels the foreground color has and which the background color has. In the bit pattern, the only lines from the two-color block that are coded are those whose allocation of the foreground colors and background colors deviate from preceding lines. Multicolor blocks that contain pixels with the foreground color are split up in an overlapping of a multicolor block and a two-color block with a transparent background. The method is particularly suited for the combination with a transform coding (e.g., JPEG) for the multicolor blocks.

Particularly high requirements for rapid compression and decompression of image data are set for the printing of variable image data on a digital printer. The printing of variable data means that at least parts of the physical page data are changed from one printed paper sheet to the next, i.e., that in extreme cases, every printed paper sheet has another content, at least partially. This requires a digital printer that does not operate with customary printing plates but which has printing mechanisms that can be directly controlled by the physical page data, e.g. electrophotographic printing mechanisms or inkjet mechanisms.

FIG. 1 shows the assembly of the image data of a physical page 1 for printing with variable image data. Three data sets are thus required, the background image data 2 for the unchanged portion of the physical page 1, the variable image data 3, that are to be inserted in the background image data 2, and the framing mask data 4, which indicate which pixels from the variable image data 3 are to be inserted. All three data sets and the assembled image data of the physical page 1 have the same resolution. The areas described by the variable image data 3 and by the framing mask data 4 are preferably of equal size. The pixels of the framing mask data 4 have one of two possible values, 0 and 1. The 0 value means that the corresponding pixel from the variable image data 3 is not inserted in the background image data 2. The value 1 means that the corresponding pixel from the variable image data 3 is inserted into the background image data 2. The image mask pixels with the value 1 are indicated with hatching in FIG. 1. The position in which the variable image data 3 are inserted into the background image data 2 is indicated by the outline 5.

Both the variable image data 3 as well as the framing mask data 4 can change from one printed paper sheet to the next. So that the assembly of the data sets for the image data of physical page 1 can thus take place step-by-step with the printing speed of the digital printer, the data are stored in compressed form in various memories or in various areas of a memory. Due to the compressed storage of the data, less memory access is required and the preparation of data for the next paper sheet to be printed is accelerated accordingly. Furthermore, it is required that the compression method used also makes a rapid decompression possible. A suitable compression method for the background image data 2 and the variable image data 3, which is based on a partition of the image data in blocks, is described in the European patent specification EP-1074143-B1.

For the compression of the category of image data with two values, to which the framing mask data 4 belong, run-length coding methods are known, in which the position and the length of line sections with pixels of the same value is coded. There is a one-dimensional operating method and a two-dimensional operating method for run-length coding. With a one-dimensional method, successive image data of the same color are counted in one image line, and the run-lengths are stored as codewords. With the two-dimensional method, the deviations of the run-length in the actual image line from the corresponding run-length of the preceding image line are coded. For both types of run-length coding, there are methods that are very widespread and standardized for facsimile transmission. Another method that is suitable for the compression of image data with two colors is known by the term LZW (Lempel, Ziv, Welch). In this method, repeating series of pixels that need not have all the same values, are coded. The known methods for compression of image data with two values have the disadvantage that they cannot be combined in a simple manner with a block-oriented image data coding for the background image data 2 and the variable image data 3. In addition, the compression of the known methods, is not effective enough for two-value image data with the highest resolution, which are used in electronic reproduction technology. Finally, with the known methods, the speed that can be attained by decompression with a computer program is limited, because the coded pixel series and the assigned codewords are not stored and processed as integral multiples of a byte length (8 bit), but which generally contain an arbitrary number of bits.

It is thus the aim of the present invention to prevent the disadvantages of the known methods for compression of two-value image data and to provide an effective and easily implemented method, with which the two-value framing mask data 4 can be rapidly compressed and decompressed and which is suitable for the combination of a block-oriented coding for the compression of multicolored image data. This task is solved by the characteristics of Claim 1. Advantageous further developments of the invention are contained in the sub-claims.

The invention is described more closely by means of the FIGS. 1 to 7 below.

Figure 2:
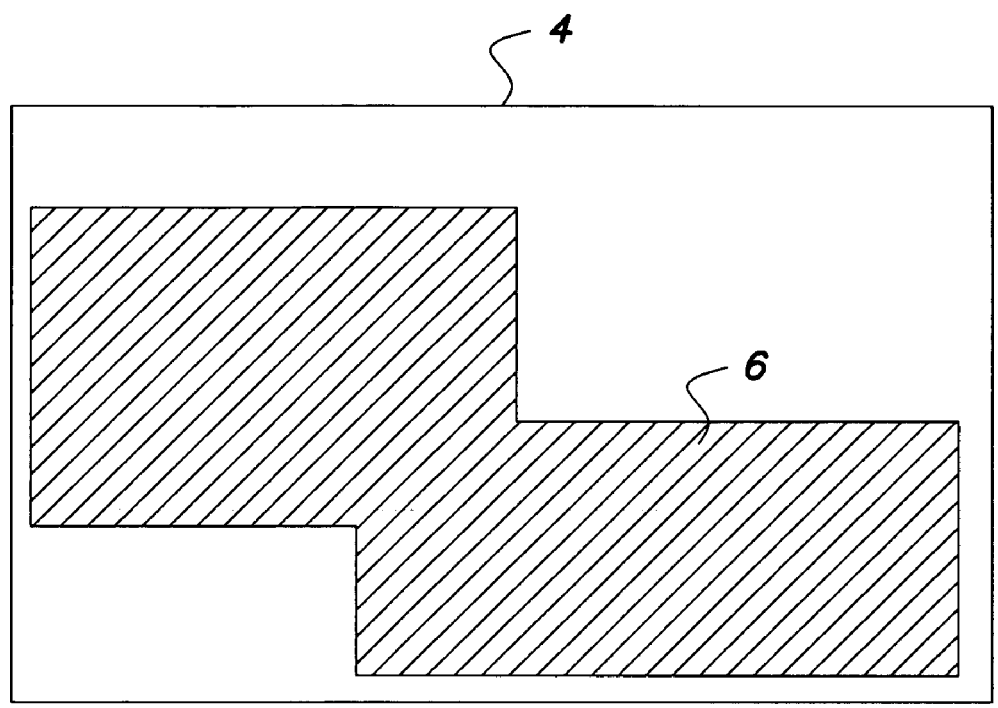
Figure 3:
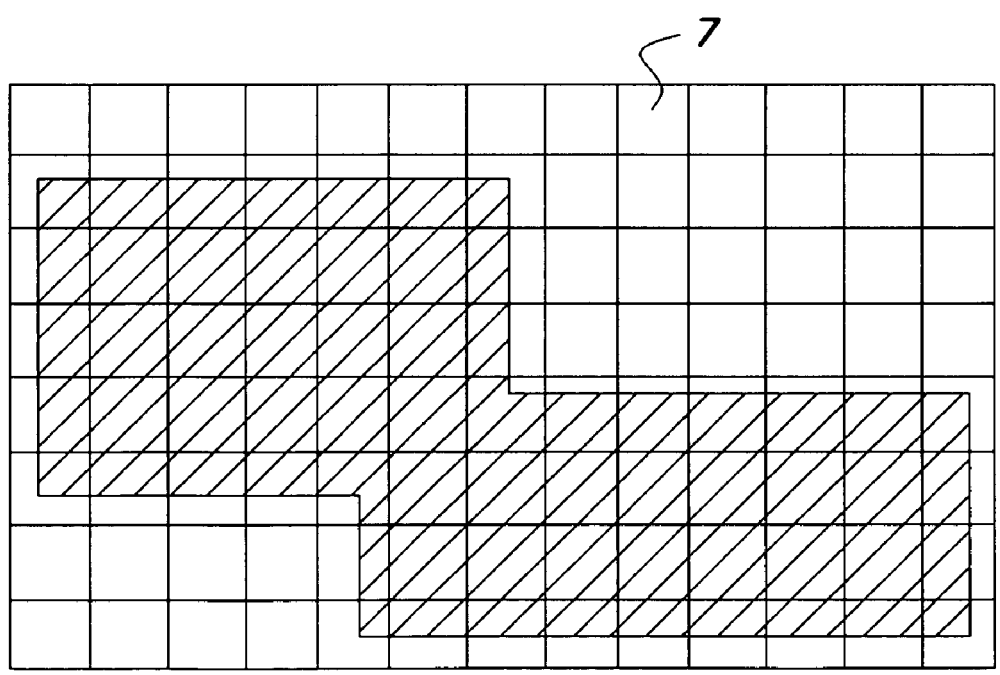
Figure 4:
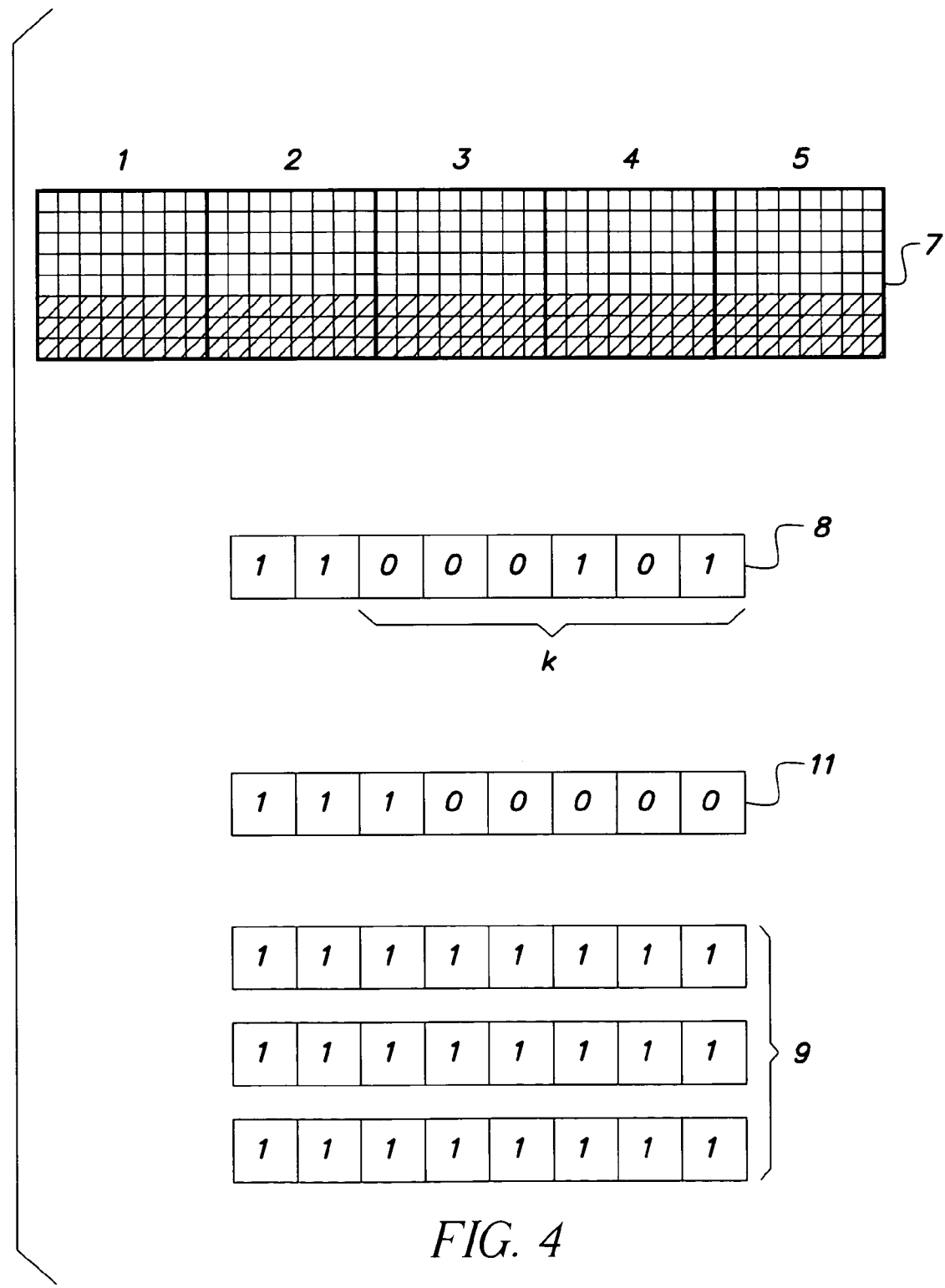
Figure 5:
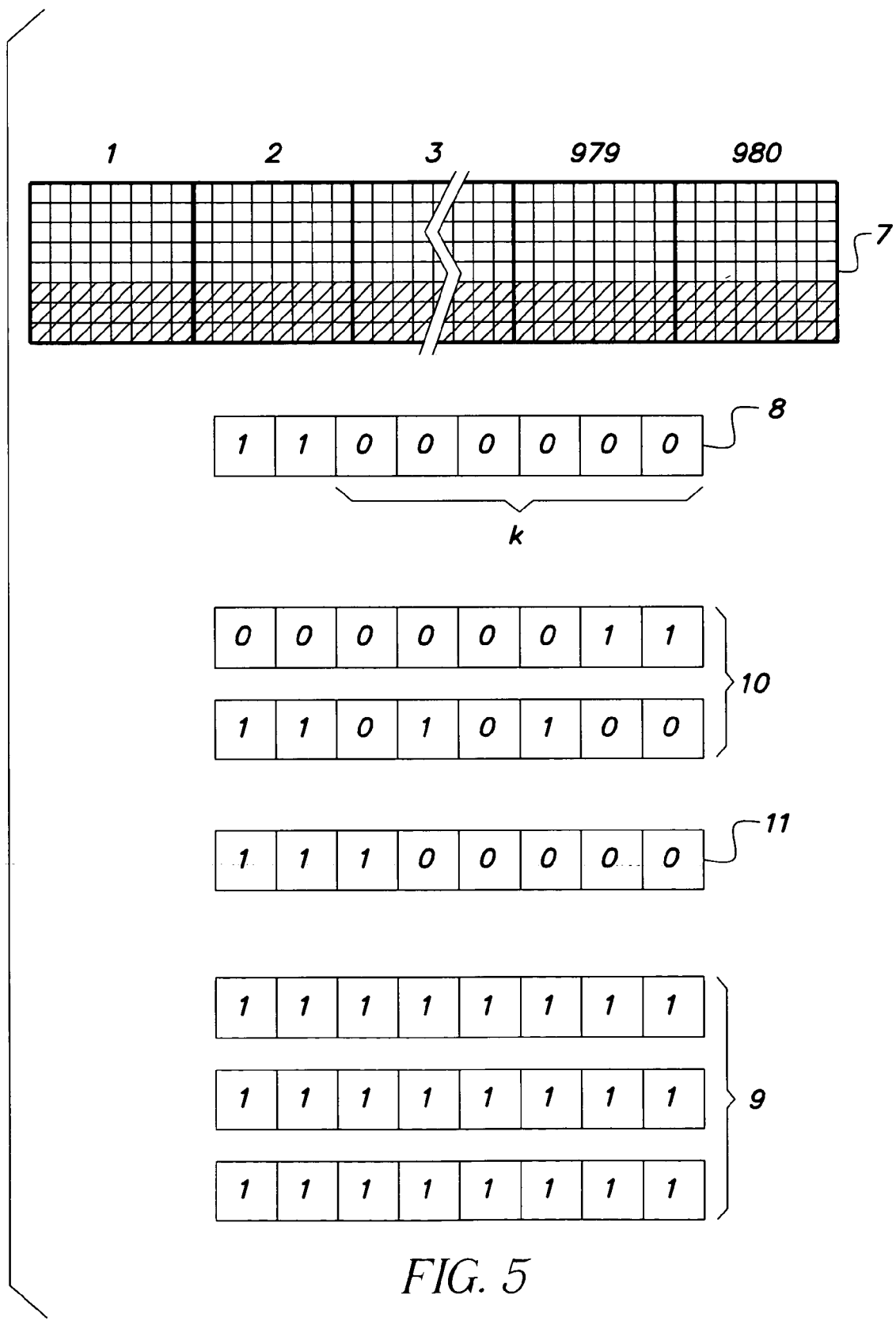
Figure 6:
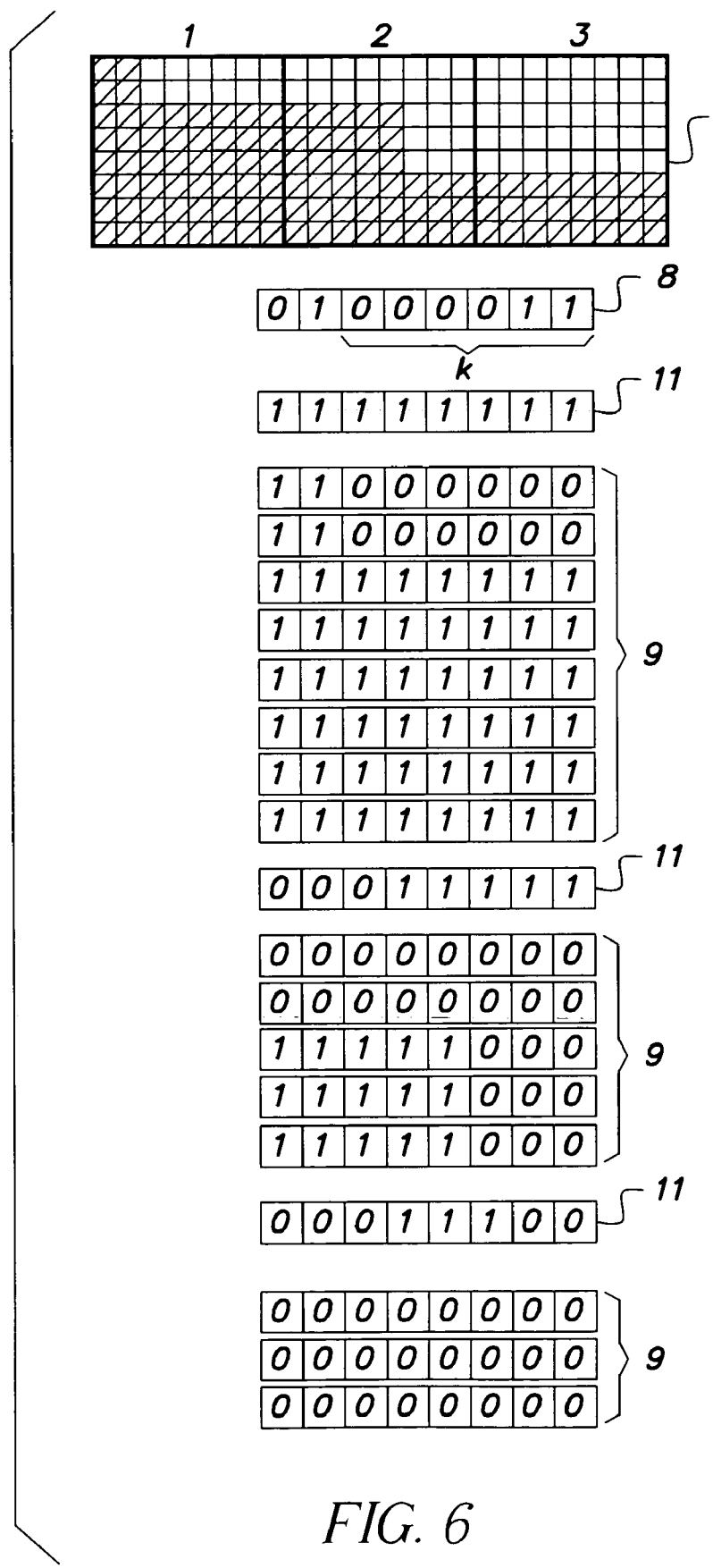

They illustrate the following:

FIG. 1 The assembly of data sets on a physical page 1;

FIG. 2 An example for the framing mask data 4;

FIG. 3 The partition of the framing mask data 4 into blocks;

FIG. 4 The coding of a small run length of blocks with the same content;

FIG. 5 The coding of a large run length of blocks with the same content;

FIG. 6 The coding of a small run length of blocks with dissimilar contents; and FIG. 7 The coding of a vertical repetition of block sequences.

FIG. 2 indicates an example for the framing mask data 4 with an irregularly shaped insertion area 6. According to the method based on the invention, the pixels are partitioned, in blocks 7 as illustrated in FIG. 3. The blocks 7 are preferably quadratic and contain 8×8 pixels. But larger and non-quadratic blocks 7 can also be used, e.g., blocks with 16×16 pixels or blocks with 16×8 pixels. It can be seen in the example in FIG. 3, that there are frequent, successive blocks 7 of the same type in horizontal block sequences. In addition, horizontal block sequences are repeated in a vertical direction. Both characteristics are used in the method according to the invention for compressing the framing mask data 4.

During the compression, horizontal successive block in the framing mask data 4 are coded sequentially. For the coding of the run lengths of successive blocks 7 and for the contents of the blocks, one or several successive codewords are used. Each codeword series consists of a command codeword and subsequent data words. The command codeword determines whether data words follow and how many, if applicable.

The first bits in a command codeword indicate in a clear manner what is coded with the codeword series. All command codewords and all data words are each one byte long.

FIG. 4 illustrates an example for five horizontal successive blocks 7 with the same content and the corresponding codeword series. A command codeword 8 contains a run length k of 1 to 63 in the last six bits, in this case the binary number 5, which indicates the number of similar blocks 7. The first bit in the command codeword 8 indicates whether the blocks 7 have the same content (the first bit has the value 1) or whether the blocks have dissimilar contents (the first bit has the value 0). The second bit of the command codeword 8 indicates whether the pixels of the first block are set to the value 0 at the beginning of the coding (the second bit has the value 1) or whether the pixels of the first block are not set to the value 0 (the second bit has the value 0). In the example in FIG. 4, the second bit of the command codeword 8 has the value 1, i.e. for all pixels of the subsequent first block to be coded the value 0 is initially assumed. This has the advantage that only the parts of the blocks that have yet to be coded are those whose pixels are different from the value 0. As a result, the command codeword is followed by a marking word 11, which contains a marking bit for each of the lines 1 to 8 of the first block 7 to be coded. The marking bits have the value 1, when not all pixels in the corresponding line have the value 0, and they have the value 0, when the pixels in the corresponding line have the value 0, i.e. if the line has changed with respect to the first assumed content (all pixels set at 0). For example, the last bit in the marking word 11 contains the marking bit for the top line in the block, the next to the last bit is the marking bit for the second line, etc. Subsequently data words 9 follow, which indicate the content only for the lines of the first block differing from 0. In the example, the marking word 11 is followed by three data words 9, which indicate the lowest three lines of the first block 7.

If the run length of the similar successive blocks 7 is greater than 63, the last six bits of the command codeword 8 are set at 0. This indicates that the command codeword 8 is initially followed by two run-length bytes 10, in which the run length is coded as a 16-bit long binary number. Then follows the marking word 11 and the data words 9, which indicate the block content. FIG. 5 illustrates an example for this case.

FIG. 6 shows the coding for the case that successive blocks 7 do not have the same content. The command codeword 8 is constructed exactly as the coding of a run length of similar blocks 7. However, the first bit is set at the value 0, to indicate that it consists of a series of dissimilar blocks. The last six bits contain the run length k between 1 and 63, in this case, the binary number 3, which in this case indicates the number of coded blocks 7. The second bit of the command codeword indicates with the value 1 that the value 0 is assumed for the pixels of the first block. The command codeword 8 is followed by the marking word 11, in which all the lines of the first block in this example are marked as differing from 0. As a result, eight data words 9 follow, which indicate the content of the first block 7. A marking word 11 for the second block 7 follows. The marking word 11 for the second and subsequent blocks 7 indicates which lines have changed compared to the preceding block. The marking bits have the value 1, when the corresponding line of the block compared to the preceding block has changed, and they have the value 0, when the corresponding line is the same as the preceding block. Data words 9 follow, which indicate only the content for the changed lines of the second block. These are again followed by a marking word 11 to indicate the changed lines of the third block compared to the second block, and these are followed by the data words 9 for the changed lines of the third block. When the run length of the dissimilar successive blocks 7 is greater than 63, the last six bits of the command codeword 8 are in turn set at 0. These are followed initially by two run-length bytes 10, in which the run length is coded as a 16-bit long binary number, and the marking words 11 and the data words 9 then follow in the same sequence, as illustrated in FIG. 6.

FIG. 7 shows the coding for the repetition in the vertical direction of a block sequence of n blocks 7, which extend over the entire width of the bit mask data 4. It is assumed in the example that the top block sequence is repeated 219 times in the vertical direction and that the first block sequence has already been compressed with the coding exemplified previously for horizontal successive sections of blocks 7. The command codeword 8 is constructed as for the coding of the horizontal block sequences 7. The first bit is set at the value 1, in order to indicate that it concerns a succession of similar block sequence. The second bit of the command codeword indicates that no blocks have been set at 0. The last six bits contain the run length k=0, which indicates that two run-length bytes 10 follow. They likewise contain the run length 0 for this case. This indicates that it does not concern the coding of a horizontal block sequence, but the coding of a vertical repetition of block sequence. The first two run-length bytes 10 are then followed by another run-length byte 10, which contains the number of the vertical repetitions as 8-bit binary numbers, which is the number 219 in the example in FIG. 7. If the number of the vertically repeated block sequence is greater than 255, the run-length byte 10 of the vertical run length is likewise set at 0 and two more run-length bytes 10 follow, which indicate that the vertical run length as a 16-bit binary number.

Since the compression method according to the invention is operated for two-value framing mask data 4 with blocks of preferably 8×8 pixels, it is very well-suited for a combination with a block coding such as the JPEG method for the background image data 2 and the variable image data 3. In addition, the compressed data can be quickly decoded with a computer program, since the codeword series are composed of whole bytes and they can thus be simply analyzed and processed. If the bit mask data 4 contains block sequences 7, which contain only pixels with the value 0 or only pixels with the value 1, these areas can be simply recognized during the decompression of the bit mask data 4 due to the block structure of the compression method. In this case, the corresponding number of blocks during the decoding of the background image data 2 or the variable image data 3, which are not needed according to the content of the framing mask data 4 for the assembled physical page data, are skipped. As a result, the compression described herein for framing mask data 4 likewise contributes to the acceleration of the processing of variable image data 3, which are to be inserted into the physical page 1.

REFERENCE MARK LIST

1 Physical page
2 Background image data
3 Variable image data
4 Framing mask data
5 Outline
6 Insertion area
7 Block
8 Command codeword
9 Data word
10 Run-length bytes
11 Marking word

I claim:

1. Method for the compression of two-value framing mask data (4), with which the assembly of background image data (2) and variable image data (3) to a physical page (1) is controlled, characterized in that
   the framing mask data (4) are partitioned in blocks (7);
   horizontal sequences of blocks (7) with the same content are coded as run lengths; and
   in horizontal sequences of blocks (7) with dissimilar content, only the lines of a block (7) that are different from the preceding block (7) are coded.

2. Method according to claim 1, characterized in that the blocks (7) have a size of 8×8 pixels.

3. Method according to claim 1, characterized in that the lines of a block (7) that are different from the preceding block (7) are indicated by the bits in a marking word (11).

4. Method according to claim 1, characterized in that vertical repetitions of block sequences are coded as run lengths.

5. Method according to claim 1, characterized in that the length of the codewords (8, 9, 10, 11) amount to a byte or multiples of a byte in the compressed data.

6. Method according to claim 1, characterized in that the partitioning of the framing mask data (4) into the blocks (7) coincides with the block structure in the compressed background image data (2) and/or in the compressed variable image data (3).

* * * * *